United States Patent [19]
Slavitter

[11] 3,914,777
[45] Oct. 21, 1975

[54] DEPRESSIBLE COUPLING APPARATUS

[75] Inventor: Frederick Slavitter, Needham, Mass.

[73] Assignee: Polaroid Corporation, Cambridge, Mass.

[22] Filed: Aug. 30, 1974

[21] Appl. No.: 502,014

[52] U.S. Cl. ............... 354/196; 350/255; 354/354
[51] Int. Cl.² .......................................... G03B 3/00
[58] Field of Search ........... 354/196, 139, 149, 195, 354/232, 272, 354; 350/255; 355/58

[56] References Cited
UNITED STATES PATENTS

| | | | |
|---|---|---|---|
| 2,464,559 | 3/1949 | Davenport et al. | 354/196 |
| 2,506,347 | 5/1950 | Davis | 355/58 |
| 3,832,722 | 8/1974 | Douglas | 354/196 X |

*Primary Examiner*—Joseph F. Peters, Jr.
*Attorney, Agent, or Firm*—Alfred E. Corrigan; Kenneth W. Anderson

[57] ABSTRACT

An apparatus included within an exposure control housing of a photographic camera for use in calibrating a focus control system coupled to an adjustable lens assembly of the camera. The camera further includes a follow-focus arrangement whereby aperture adjustment is mechanically coupled to the focus control system of the camera for regulating exposure at an image plane of the camera.

The apparatus is mounted upon an axis for free rotation thereof when used as a coupling device between the focus control system and the lens assembly and is further adapted to be depressibly disengaged longitudinally along the axis from either the focus control system or the lens assembly whereby each are independently movable to a position corresponding to a selected camera-to-subject distance properly focusing a sharply defined image and providing an appropriate aperture size for proper exposure of the image as determined at the image plane of the camera.

17 Claims, 8 Drawing Figures

DEPRESSIBLE COUPLING APPARATUS

BACKGROUND OF THE INVENTION

1. Field of the Invention

This invention relates to photography and, more particularly to an apparatus included within a photographic camera for readily calibrating the focusing system of the camera after the camera has been essentially assembled in a factory or repair center.

2. Description of the Prior Art

The photographic art is replete with various types of photographic apparatus which in a broad sense perform the same job of focusing light upon a photosensitive surface to form an image. The differences between photographic apparatus is determined by how well and how easily each apparatus performs the job. To do the job properly various systems are assembled to construct the apparatus; such as viewing, lens, focusing and exposure control systems, discriminately matched or paired, or provided with some means for adjustment whereby variations due to manufacturing tolerances are nullified when the systems are attached to the body of the apparatus. Generally, the systems contain members which are produced in large quantities by a variety of manufacturers, delivered to one assembly point, and pre-assembled as a system before being attached to the body of the apparatus. A subsequent replacement of a damaged member of an apparatus returned for repair can change the apparatus's performance as the replacement member is seldom an exact duplicate of the original member due to the variation in manufacturing tolerances. Therefore, there is a need for a device which enables an assembler or repair person to quickly and easily calibrate the focusing control system of an essentially completely assembled photographic apparatus to define a sharply defined image at an image plane thereof.

In addition, when the apparatus is operated in conjunction with artificial illumination, e.g., flash, an exposure mechanism of the apparatus is often adjusted in accordance with levels of illumination anticipated at a scene being photographed. To anticipate these levels, an evaluation is made based upon an application of the inverse square law of light energy propogation. Under this law, the light energy available from a given source is considered to vary inversely with the square of a distance from the source. Accordingly, to make an appropriate exposure mechanism adjustment for flash photography, light source-to-subject distance is derived and a value of this distance is utilized to compute an appropriate exposure value for the apparatus.

In some of the more recent camera designs, exposure control adjustment for flash operation is effected automatically by incorporating within the camera what is termed a "follow-focus" system. With a follow-focus arrangement, aperture adjustment or flash illumination output control is mechanically coupled with a range finding or focusing system of the camera.

Where flash illumination output control is adjusted as a follow-focus procedure, the exposure control system operates with a fixed aperture size at a fixed exposure interval and relies upon the mechanical coupling of the focusing system with the illuminating source to regulate the amount of light energy delivered to the subject whereby the proper exposure of the image of the subject is reflected back through a lens system thereof along an optical path to the image plane. By properly focusing the camera to provide a sharply defined image as viewed through the viewing system, the mechanical coupling in response to movement of the focusing system regulates and positions a plurality of louvres stationed in front of the illuminating source which deflect and/or direct the illumination as determined by the properly focused camera for the camera-to-subject distance. Therefore, the follow-focus calibration is directed to the relative positions of the mechanical coupling device and the louures on the illuminating source which is detachable and only used during operation of the camera in a flash mode. The position of the louvres as determined by the engagement with the mechanical coupling device are accessible for calibration and any adjustment made thereto does not effect the exposure controls of the camera in the fixed aperture and fixed exposure interval mode.

Where the aperture is adjusted as a follow-focus procedure, the exposure control housing of a camera must incorporate one aperture adjustment mechanism for daylight regulation as well as another control system which is operative exclusively for flash illuminated exposures which does not otherwise interfere with the daylight exposure regulating system. A follow-focus control technique for such an exposure control system is shown in U.S. Pat. Nos. 3,750,543 and 3,832,722 wherein there is described a flash mode control system which arrests a position of the exposure-aperture blades in accordance with focal setting. The focusing system is coupled by an idler gear to the lens assembly whereby the lens assembly moves rectilinearly along a locus in response to rotation of a focus wheel. Rotation of the focus wheel also operates to determine the aperture size in accordance with the camera-to-subject distances only when the camera is in the flash mode. When calibration between the lens assembly and the focus wheel is required, whereby a sharply defined image is formed at the image plane of the camera, or there is a need to calibrate the exposure-aperture of the camera in the follow-focus mode of operation, a set screw is loosened in the bottom of the exposure control housing which, in turn, permits a small spring to offset an axle of the idler gear to an extent wherein the idler gear drops out of mesh with the focus wheel and the lens assembly having gear teeth peripherally arranged thereon. Once the calibration has been completed and set screw is again tightened to reposition the idler gear.

It has been found that this arrangement is unsatisfactory. The calibration is preferably performed upon the camera after the camera has been substantially assembled and the exposure mechanism has been enclosed. Any malfunction of the arrangement or failure thereof to perform as intended would require an exposure mechanism housing cover to be removed and the arrangment to be repaired.

In order for the idler gear to drop vertically, the axle, upon which the idler gear is mounted, is located within an eccentric hole and require to rotate therein retained only by a leading edge of the set screw bearing against an undercut portion of the axle acting against a force of the spring biasing the axle vertically downward. Locating and machining the eccentric hole within a stationary mount included as an integral member of a base block is a difficult task as is well known in art. Improperly tempered springs often fail to bias the idler gear forcefully enough to disengage the idler gear and improperly torqued set screws may shear off within a threaded base of the arrangement and/or the exposure housing making removal for future calibration or repairs extremely diffficult.

In succh a blind assembly if an operator observes a failure of the idler gear to disengage, the operator all to frequently continues to remove the set screw until it clears the bottom of the exposure housing whereby the set screw is often lost and a delayed dropping by the idler gear positions the shaft within the eccentric hole such that a replacement set screw does not find and seat itself within the undercut provided therefor. The operator at this point must decide to either continue to search for the undercut portion or remove the exposure housing cover and manually position the idler gear until the set screw has been tightened. such problems are in addition to being frustrating, an extremely costly delay when one is attempting to mass produce large quantities of cameras daily.

In addition, by disengaging the idler gear from both the focusing wheel and the lens assembly for calibration the idler gear, upon return to the coupled position, is required to mesh with the gear teeth of both members which may require a properly calibrated focus wheel or lens assembly to be moved again in order to mesh with the idler gear thereby effecting the accuracy of the camera. The accuracy is determined by the relationship of the gear teeth included upon the periphery of the focus wheel and the lens assembly and the ability of each to mesh at a calibrated position with the idler gear.

From the foregoing, it can be seen that there is a need for a device which allows an essentially completed camera to be calibrated for proper exposure and properly focused at an image plane thereof quickly, easily, and reliably by an assembler or a repair person in a modern assembly line operation or in a factory repair station by uncoupling the various coupled systems until each have been calibrated and set in a location which provides proper exposure and focusing thereof at the image plane.

BRIEF SUMMARY OF THE INVENTION

The invention relates to photographic apparatus and, more particularly, to a device included within an exposure control housing of an essentially completely assembled photographic camera which operates to disengage a focusing control system coupled to a lens assembly and an aperture regulator system included within the control housing whereby each of the systems can be individually calibrated and subsequently set to provide a sharply defined image and a proper exposure at an image plane of the camera for a variety of camera-to-subject distances. With such a device, it is possible to couple randomly selected pre-assembled camera bodies and exposure control housings, including an exposure control system, a lens assembly and a focusing control system, to each other despite variations in manufacturing tolerances allowed for each component used in the construction of each system.

Variations in manufacturing tolerances is a well known problem confronted in the assembly and integration of a multiplicity of systems to form a unitary system which performs adequately. Often the variations occur as a result of tool and die wear, mold wear, as a function of the capability of a machine or operator producing a piece part used in one of the systems, and design considerations wherein low tolerance piece parts result in additional piece part cost. Therefore, in mass producing the piece parts, there is a variation of size between piece parts used by an assembler to preassemble each system. To offset the variations in final assembly, an assembler could by discriminately selecting and coupling piece parts compensate for the variations of each piece part and thereby assemble a system which would fall into a nominal value for the unitary system but such a method would not be conducive to modern assembly techniques and therefore unsuitable for large volume production. In a final assembly of the various systems to form the unitary system the various systems would once again have to be discriminately selected and coupled selectively to compensate for the variations of each preassembled system.

When assembling preassembled systems to produce a photographic camera, each system is individually designed and constructed to contribute collectively to a sharply defined image of a photographic object at an image plane of the camera and to form a satisfactory image properly exposed upon a photosensitive surface positioned at the image plane.

Although each system is tested individually to determine whether or not the system falls within the specifications for that system, variations in the manufacturing tolerances of a camera body may alter the results of that test. Therefore, once the system is attached to the camera body and coupled to other systems included thereon, there is a considerable amount of fine tuning or calibrating to be performed upon the camera during final stages of assembly to combine the systems to form one single system or unitary body. The most logical location to determine accurately whether or not the camera is acceptable is at the location whereat the photosensitive surface of film is located within the camera, i.e., at the image plane. The present invention enables an assembler to calibrate the focusing control system, lens assembly, and a follow-focus control by quickly disconnecting the focusing control system from the lens assembly in a completely assembled camera wherein a follow-focus arrangement is devised which provides aperture adjustment as an exposure control measure. The invention further enables the assembler to calibrate an aperture size for a specific object distance by measuring the exposure at the image plane of the camera and calibrating or fine tuning the aperture size to fit the exposure value for the selected distance without altering the sharp image registered at the image plane. The focusing control system is coupled to the lens assembly by an idler gear which is rotatably mounted upon a post and retained in a forwardly biased position by a relaxed compression spring. When the idler gear is in the forwardly biased position the idler gear is in mesh with a focus wheel and the lens assembly both of which include gear teeth peripherally arranged thereon. By applying pressure upon the idler gear, the compression spring is compressed against a face of a housing wherein one end of the post is mounted for rotation whereby the idler gear is slidably moved longitudinally along the post and rotational axis thereof to a position wherein the idler gear is disengaged from the focus wheel while remaining in mesh with the lens assembly thereby enabling the assembler to move the focus wheel and the lens assembly relative to each other for proper calibration without disturbing the position of the other. When the calibration has been completed, the idler gear returns to the biased position in response to a release of energy stored in the spring during compression thereof whereupon the idler gear snaps back into mesh with the focus wheel.

Accordingly, an object of the present invention is to provide an apparatus for factory calibrating a focus control system coupled to a lens assembly of a photographic camera whereby a sharply defined image is formed at an image plane of the camera for a variety of camera-to-subject distances represented between distant and near foci.

It is yet another object of the invention to provide for factory calibration of a photographic camera including an automatic exposure control system coupled to a focusing control system having follow-focus capability for operation under ambient or flash illumination conditions which provides for follow-focus aperture regulation without altering an established sharply defined image at an image plane of the camera.

Another object of the invention is to provide a method for calibrating exposure at an image plane of an essentially completed phtographic camera after an exposure mechanism cover has been positioned and attached to an exposure control housing by simply depressing the apparatus whereby a focusing control system and a lens assembly coupled thereto are uncoupled for independent movement relative to each other to provide proper exposure at the image plane.

A further object of the invention is to provide an apparatus for a photographic camera which enables an assembler to substantially match exposure control systems, focusing control systems, and lens assemblies with camera bodies indiscriminately by separately calibrating each to compensate for variations due to manufacturing tolerances of each and thereby provide good exposure and sharply defined images over an entire range of camera-to-subject distances.

Other objects of the invention will in part be obvious and will in part appear hereinafter.

The invention acordingly comprises the apparatus possessing the construction, combination of elements, and arrangements of parts and the method involving the several steps and the relation and order of one or more of such steps with respect to each of the others, which are exemplified in the following disclosure and the scope of the application of which will be indicated in the claims.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE INVENTION

Figure 1:
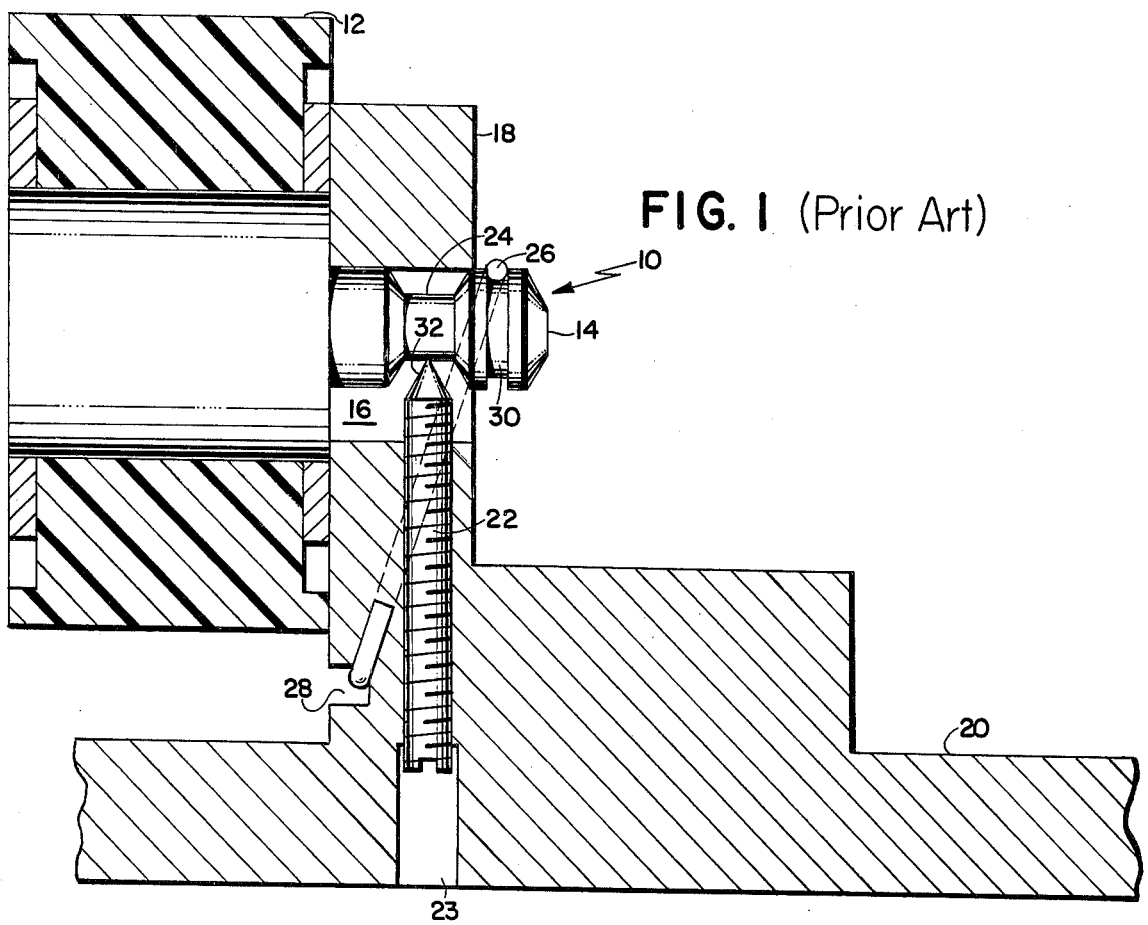
FIG. 1 is an enlarged sectional side view of a prior art structure shown in an upright coupling position.

The apparatus and systems referred to in the present application are ideally suited for incorporation within a fully automated single lens reflex camera. To perform in reflex fashion, these cameras include a reflexing mirror which is normally retained in a viewing mode orientation permitting a scene to be framed and focused at a viewing surface while covering a photosensitive surface of a film at an image plane or exposure plane of the camera within which it is located.

To derive adequate lighting for purposes of viewing and focusing, and exposure control arrangement maintains a full aperture opening and an open shutter until a photographic cycle is commenced. When the camera is actuated to start such a cycle, the shutter is fully closed to secure its exposure chamber while the mirror is moved into an exposure orientation uncovering the image plane. Following this maneuver, an exposure is made after which the shutter is again held fully closed while the mirror is returned to its initial viewing mode orientation. As this orientation is again reached, the shutter is opened to provide for viewing and focusing in preparation for a subsequent photographic cycle.

The exposure regulator preferred for incorporation in the camera is one which is formed as a two-bladed shutter-aperture mechanism which is driven between relaxed and energized conditions for selectively blocking light along an optical path of the camera. The mechanism further provides for automatic exposure control utilizing a light sensitive network actuated drive which provides a programmed weighting of aperture and exposure interval for that range of scene brightnesses most commonly encountered in conventional photographic practice. The automatic exposure control system has follow-focus capability which provides for a range responsive aperture adjustment. The follow-focus arrangment operates in conjunction with a focusing control system of the camera which in turn is coupled to a lens assembly and provides objective lens focusing. For follow-focus operation, movement of the focusing control system to obtain a sharply defined image at the image plane of the camera operates to establish an aperture size corresponding to a subject distance and a practical output range of a source of artificial illumination used with the camera.

The sequence of operational events occuring during the flash performance of the reflex camera incorporating the follow-focus arrangement is presented herein. The camera is switched into a flash mode performance setting and the photographic subject is framed and brought into simultaneous sharp focus in a viewer and at the image plane by adjusting the focusing system. An automatic cycle is commenced with a depression of a start button which causes the shutter aperture blades to close. The blades are held close at least until the mirror fully uncovers the photosensitive surface of the film positioned at the image plane of the camera. Following the uncovering of the photosensitive surface and while the shutter-aperture blades remain closed a follow-focus interceptor function is actuated. The blades progressively open to define an aperture for a proper exposure of the photosensitive surface positioned at the image plane for the selected camera to subject distance and the travel of the blades is arrested at a point which provides such an aperture. Once the aperture is established, a flash is ignited and the blades return to the closed position and remain closed until the image plane is fully covered; whereupon, the blades are released to define a maximum aperture for operating the camera in the viewing mode and the interceptor function is retracted from the path of the blades.

The follow-focus interceptor function operates in conjunction with the focusing system of the camera and shall be described in detail later herein. The location of an interceptor used to arrest the travel of the blades, whereby the proper aperture size is determined to provide the proper exposure at the image plane, has a direct relationship to the relative location of the adjustment mechanism of the focusing system which provides the sharply defined image of the photographic subject at the image plane of the camera. Therefore, by adjusting the focusing system to present a sharply focused image in the viewing screen, the viewer is also adjusting the exposure aperture and the image of the photographic subject at the image plane of the camera when the camera is performing in the follow-focus mode of operation.

In order to match the focusing control system, the follow-focus interceptor mechanism and lens assembly as components of the camera to provide the sharply defined image and proper exposure at the image plane of the camera, there is a need for each of the components to be finely tuned or calibrated separately after each has been attached to the body of the camera and coupled to each other. Variations within manufacturing tolerances of the camera body such as a distance between a mounting surface of the lens system and the image plane can be compensated for by such calibrating techniques whereby each system is custom tailored to fit and operate within a specific camera body. Additionally, an ability to calibrate a substantially sealed or enclosed exposure control system calibrated without a cover in order to prevent scattered light rays from entering the camera and obscuring measurements of exposure taken at the image plane of the camera. Often fixtures having light tight encasements designed to receive the exposure control systems are constructed for such purposes. Therefore, the systems must have some means of disconnecting one from another for independent calibration thereof when sealed within the camera. A conventional arrangement previously employed to uncouple the focusing control system from the lens assembly for calibration is shown in prior art FIGS. 1 and 2. In FIG. 1, a prior art device 10 is shown including an idler gear 12 attached to an axle 14 and rotatably mounted within an eccentric opening 16 included within an upper portion of a pedestal mounted 18 suitably joined to a surface of an exposure control housing 20. The device 10 is retained in a coupled position with the lens assembly and focusing control system (not shown) by a set screw 22 threadably inserted through the exposure control housing and the pedestal mount 18 to contact axle 14 within a first undercut area 24 of the axle 14. The idler gear 12 is coupled to the pedestal mount 18 by a spring 26 having one end attached to mount 18 in a slot 28 for receiving that end and a second end attached to a second undercut area 30 of the axle 14. when the set screw 22 is tightened, pointed end 32 contacts first undercut area 24 and applies a force against axle 14 thereby elevating the axle 14 and stretching spring 26 until idler gear 12 is coupled with the focusing control system and the lens assembly. The spring 26 holds the axle 14 in position when placed in tension by the elevation of the axle 14. When the idler gear 12 is rotated in the coupled position, pointed end 32 of the set screw 22 and the second end of the spring 26 ride upon the surface of the axle 14 within first and second undercut areas 24 and 30. The undesirable features of this arrangement have been previously described above and has led to a development of the present invention which provides increased reliability and relatively quick disengagement without the use of any additional tools or equipment and without requiring the arrangment to be disassembled and subsequently reassembled upon the completion of the calibration. In addition thereto, improved reliability and reduced manufacturing and assembly costs result from the employment of the present invention.

Figure 2:
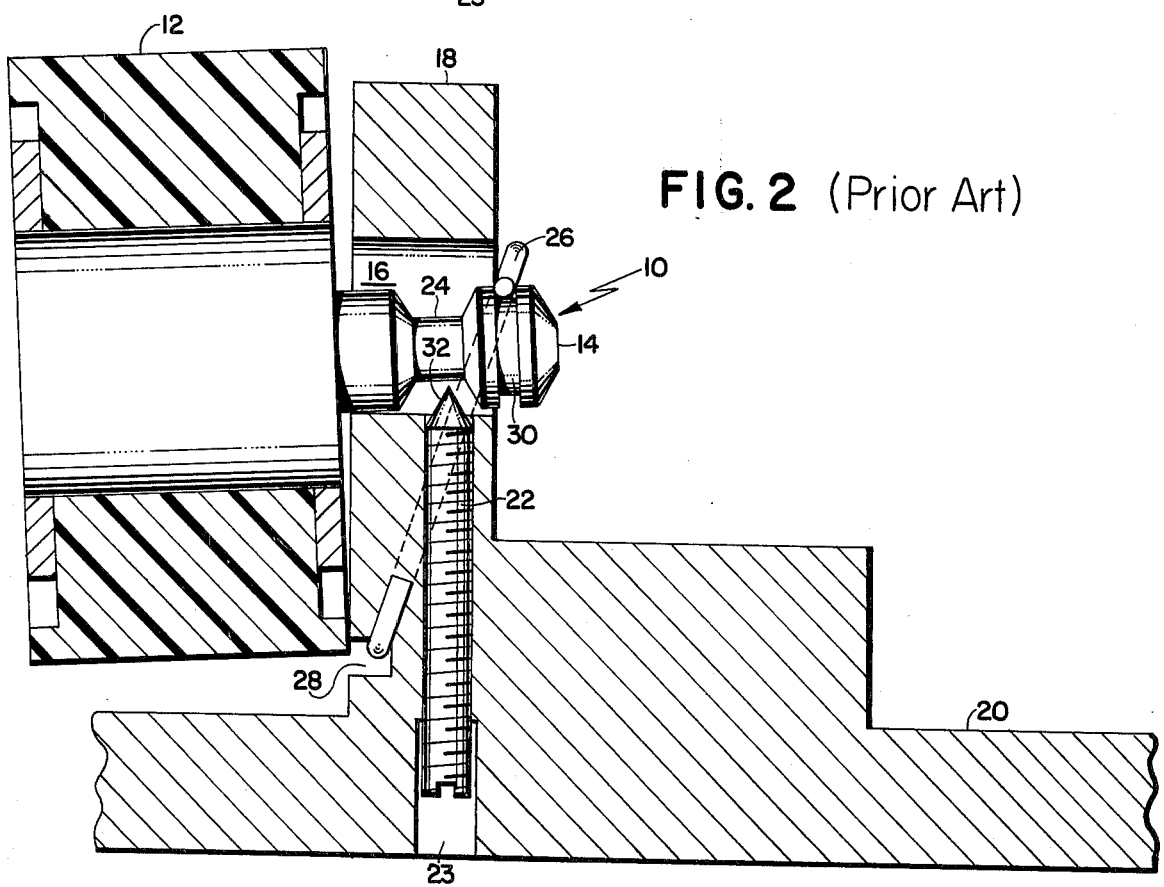
FIG. 2 is an enlarged sectional side view of the prior art structure of FIG. 1 shown lowered into an uncoupled position.

Referring to FIG. 2, the prior art device is shown in the uncoupled position wherein the idler gear 12 has been moved out of engagement with both the lens assembly and the focusing control system. The set screw 22 has been loosened thereby removing the force applied against the axle 14 and releasing the tension in the spring 26. The idler gear 12 is lowered into an uncoupled position by the force of its own weight cooperating with the return of the spring 26 to its original length, i.e., the unstretched, relaxed length.

Pursuant ot the calibration of the focusing and exposure controls of the camera, the set screw 22 is retightened to elevate the idler gear 12 into a position reestablishing engagement with both the focusing control system and the lens assembly. Experience with the failure of this prior art device to reliably perform and the resultant time consuming corrections necessitated by such malperformance have shown there is an immediate need for a more reliable replacement therefor.

As previously stated, upon loosening set screw 22 from within bore 23, a portion of which is threaded, the set screw would often be backed out of the bore 23 too far, beyond the threaded portion, and would drop out of the bore. An even more severe problem would occur when the set screw 22 would be over tightened with the bore 23 whereby the set screw 22 would shear off therein thereby requiring further machining to remove the broken pieces.

Furthermore, there was not assurance when the set screw 22 was tightened that the idler gear 12 would be properly aligned with the focusing control system and the lens assembly due to the disengagement of the idler gear 12 from both assemblies. The set screw 22 and the spring 26 often failed to cooperate in preventing the axle 14 from being elevated in a non-parallel relationship to the rotational axis of opening 16, i.e., in a cocked position, whereby the idler gear 12 would fail to remain engaged with the focusing control and lens assembly during a complete revolution of 110 engaged the idler gear 12. The spring 26 used in the prior arrangement is a pre-formed wire spring having a critical spring rate which controls the elastic ability of the spring 26 to return to its original length after a stress applied thereto has been removed. Having been positioned and retained in tension for an extended period, a permanent strain or set due to excessive strain may prevent the spring 26 from returning to its original length. The spring 26 can rupture and break if overstressed in tension, whereby, in either case, the exposure housing cover would have to be removed and a new spring attached. Attachment of the original spring 26 or a new spring of a similar type is a relatively difficult assembly operation as the assembler has to assure each end of the spring 26 is properly located with slot 28 and second undercut area 30 leading to excessive time consumption and assembly costs. By replacing the spring 26 of the prior arrangement with a compression spring (as shown in FIG. 3) having a relatively greater endurance life and a less critical spring rate by design, a most undesirable characteristic of the prior art arrangement is avoided and the previous difficult assembly operation is eliminated.

Figure 3:
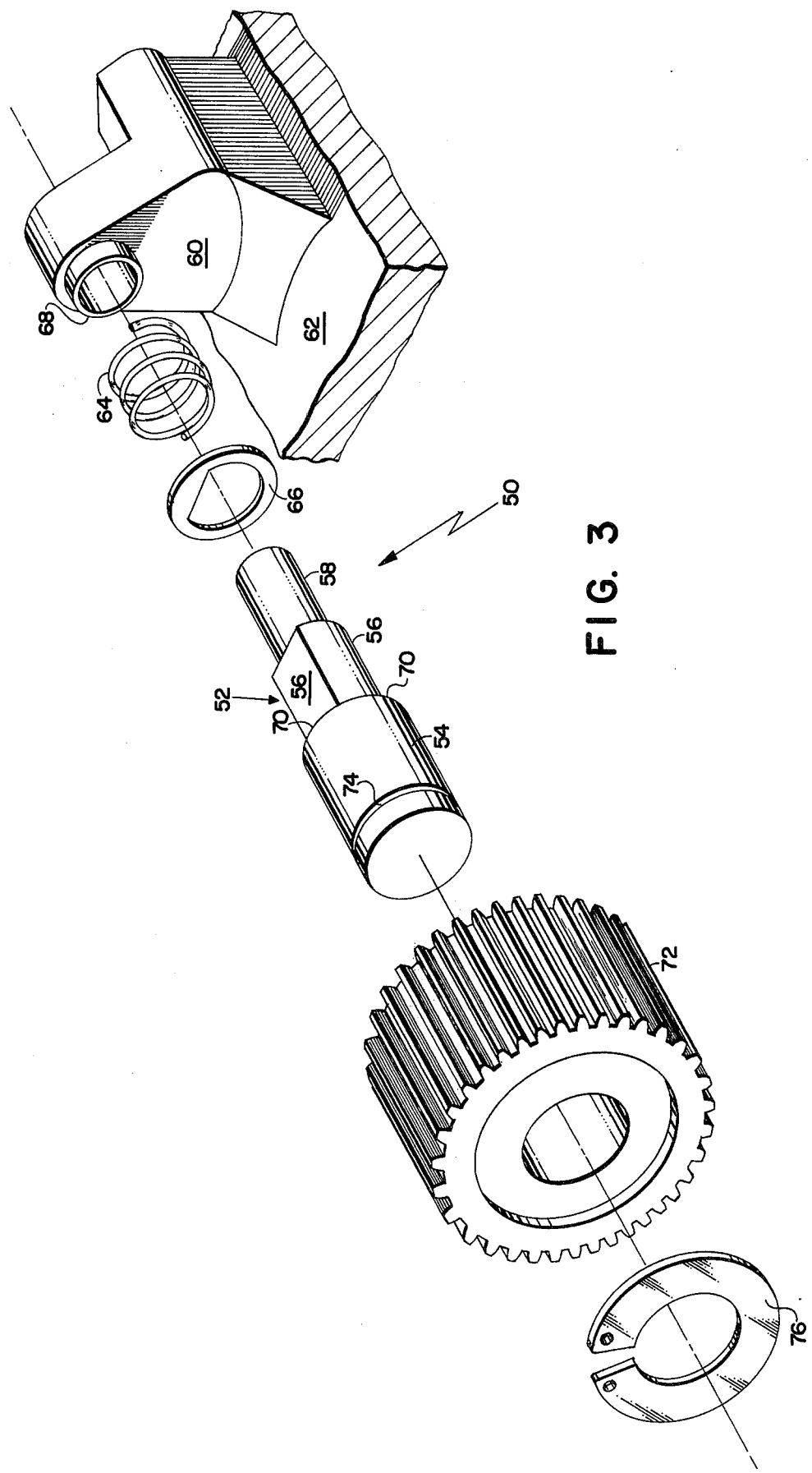
FIG. 3 is an exploded pictorial view of the present invention with each member thereof perspectively shown in their related positions.
Figure 4:
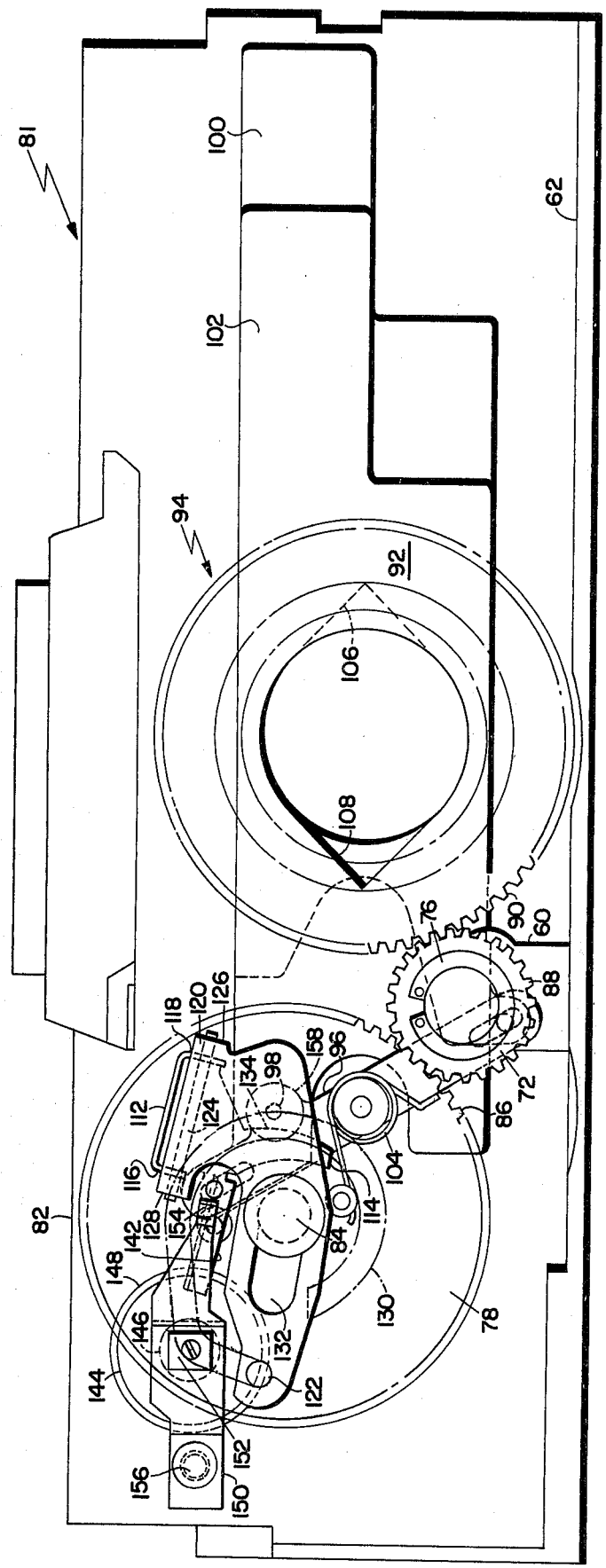
FIG. 4 is a front view of an exposure control mechanism operating in a viewing, full aperture mode mounted within an exposure mechanism housing having a cover removed.

A coupling apparatus 50 which provides substantially improved reliability and relatively fast disengagement unassisted by additional tools is shown disassembled in FIG. 3. The coupling apparatus 50 comprises a shaft 52 having a first cylindrical portion 54 and a pair of opposing, substantially flat areas 56 interposed the first cylindrical portion 54 and a second cylindrical portion 58. The second cylindrical portion 58 is fixedly attached to a pedestal mount 60 joined to a base portion 62 of an exposure control housing subsequent to a placement of a compression spring 64 and a collar 66 about the second cylindrical portion 58. The second cylindrical portion 58 is press-fitted within an aperture included within a ring 68 in mount 60 and firmly supported therein. The spring 64 is positioned about the ring 68 and about the second cylindrical portion 58 between the mount 60 and the collar 66. The flat areas 56 include a surface to surface thickness substantially less than an outside diameter of the first cylindrical portion 54 of the shaft 52 and substantially greater than an outside diameter of the second cylindrical portion 58. The collar 66, having an inner diameter slightly greater than the surface to surface thickness of the flat areas 56, moves along the flat areas 56 and is maintained in position against leading edges 70 of first cylindrical portion 54 of shaft 52 by the spring 64. The idler gear 72 is rotatably coupled to the first cylindrical portion 54 of the shaft 52 and retained thereon by an expandable ring 76 adapted to be located in a groove 74 located in first cylindrical portion 54. The idler gear 72 is positioned between the ring 76 and one face of the collar 66 and is adapted to be manually moved axially across outer surfaces of the first cylindrical portion 54 from a first position wherein the one face of the collar 66 is in contact with edges 70 of the first cylindrical portion 54 to a second position wherein the idler gear 72 maintains the spring 64 in a compressed state.

Referring to FIGS. 4–7, a manually rotatable focus wheel 78 is shown mounted upon a pivot screw 80 upon one side of the exposure control housing 81. Screw 80 is threadably connected by suitable means to rear casting 82 of housing 81 and extends through both the focus wheel 78 and a focus wheel bushing 84. Focus wheel 78 is formed having peripherally disposed gear teeth 86. These teeth 86 are meshed with teeth 88 of the idler gear 72 which, in turn, is in driving connection with external gear teeth 90 of a cylindrical bezel 92 of lens assembly 94. The lens assembly 94 is rotatably moved by the focus wheel 78 to provide objective lens focusing and, as may be apparent, the rotational orientation of the focus wheel 78 continuously corresponds to the focus setting of the lens system.

A walking beam 96 supporting a follow-focus striker pin 98 upon an upper portion of one side moves through a predetermined arcuate locus of travel as blades 100 and 102 are driven either under the bias of a spring 104 or form a plunger of a first solenoid (not shown). Blades 100 and 102 each include an opening 106 and 108, respectively, which cooperate to define an exposure aperture 110. In the follow-focus mode of operation, the openings 106 and 108 cooperate to define a range of predetermined exposure apertures across the optical path thereby establishing a predetermined focus responsive apertural value which provides the proper exposure of the photosensitive surface of the film in accordance with an intensity of illumination received at the image plane of the camera.

For follow-focus operation, the movement of the walking beam 96 (in a clockwise direction, as viewed in FIG. 4) along its locus of travel establishing an increasingly smaller aperture is selectively arrested to establish the predetermined focus responsive apertural value. Motion arrest is provided generally by a follower linkage which includes, inter alia, an interceptor component or arresting link 112 which is selectively positioned within the above-noted locus of travel so as to contact striker pin 98 to halt the exposure mechanism as it moves under the bias of spring 104. Contact with striker pin 98 is effected at a downwardly extending leg portion 114 of the interceptor arresting link 112. Relative positioning of link 112 within the locus of travel of striker pin 98 is provided by virtue of its hinged connection through tabs 116 and 118 with an interceptor assembly 120 incorporating a cam follower 122. The hinged connection is established by a threaded hinge pin 124 passing through tabs 116 and 118 and journaled for rotation between supporting tabs 126 and 128 of the interceptor assembly 120.

The interceptor assembly 120 including the cam follower 122 is operatively associated with the rotational orientation of the focus wheel 78. This association is provided by a radial connection of the follower 122 extending from the interceptor assembly 120 and slidably driven in positive fashion by a face groove cam 130 formed within one face of the focus wheel 78. To provide for radial performance, the interceptor assembly is formed having an elongated slot 132 dimensioned to fit over bushing 84 and pivot screw 80. the interceptor assembly 120 is slidably supported upon the bushing 84 which is positioned co-axially with a center of rotation of the focus wheel 78. Rotation of the focus wheel 78 moves the face-groove cam 130 to drive the interceptor assembly 120 in a linear manner. This motion positions an arcuate forward edge 134 of leg portion 114 to halt striker pin 98 of walking beam 96 at select orientations thereby intercepting the travel of blades 100 and 102 whereby openings 106 and 108 ddefine exposure aperture 110 (shown in FIGS. 5 and 6).

Figure 6:
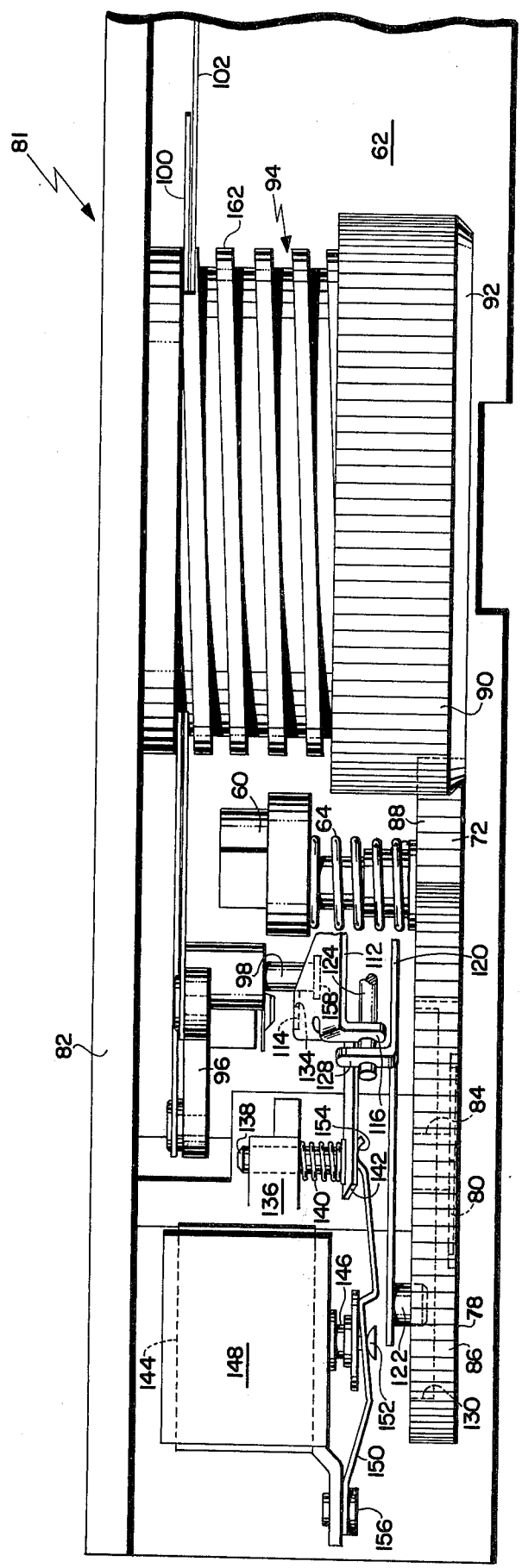
FIG. 6 is a top view of FIG. 5 having a focusing system coupled to a lens assembly according to the present invention.

An arrangement for enabling or actuating the follow-focus system, and more particularly, interceptor arresting link 112 is revealed in more detail herein. The interceptor arresting link 112 is selectively movable into the arcuate locus of travel of striker pin 98 as a result of its hinged connection at hinge pin 124. Inasmuch as this interceptor must be removed from the noted locus of travel of striker pin 98 during select portions of the flash mode photographic cycle, i.e., when blades 100 and 1'move to 102 fully closed position prior to re-opening to define the exposure aperture 110, it is biased to retract inwardly against the surface of interceptor assembly 120. This bias is provided by a spring loaded plunger assembly 136. The plunger assembly 136 includes an interceptor return pin 138 which is journaled for slidable movement within a bore formed within rear casting 82 of the exposure control housing 81. Outward bias for the plunger assembly is provided by a spiral spring 140 slidably wound about pin 138 and abuttably seated between the head thereof and rear casting 82. The head of the pin 138 is positioned to abut against an extension 142 of interceptor arresting link 112, thereby urging the retraction of link 112 from its position engaging the exposure mechanism at striker pin 98, as shown in FIG. 6 to the position shown in FIG. 7.

Acutation of the follow-focus interceptor is provided by select energization of an electromagnetic drive comprising a second solenoid 144 having an internally disposed plunger 146 which is retractable within the solenoid upon energization thereof. Second solenoid 144 is mounted in stationary fashion upon rear casting 82 by a bracket 148. The outwardly extending tip of the solenoid plunger 146 is connected to a pull-down bar 150 by a threaded fastener 152.

Figure 7:
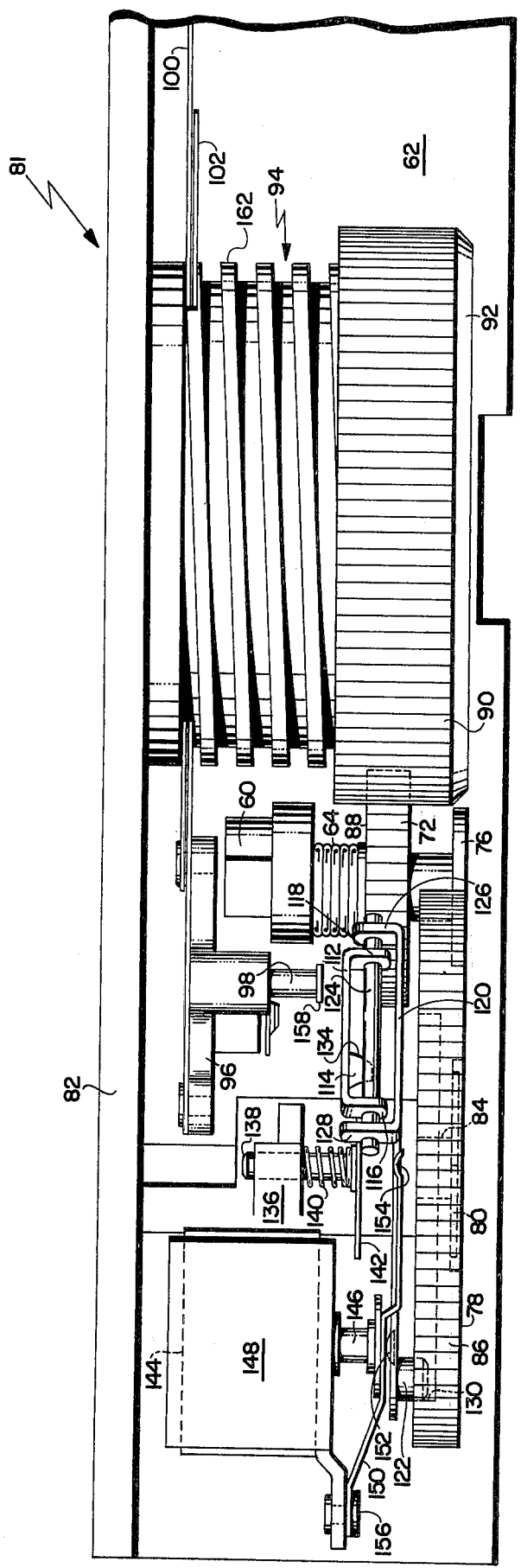
FIG. 7 is a top view of FIG. 4 showing the focusing system uncoupled from the lens assembly according to the present invention.

The pull-down bar 150 is configured having an extended arm portion 154 which is arranged to slidably contact and abut against the surface of extension 142 of link 112. Pull-down bar 150 is loosely pivoted at 156 to a bracket 148. When second solenoid 144 is energized, its plunger 146 is retracted thereby pivoting pull-down bar 150 inwardly about its pivot 156. This motion pivots link 112 about its hinged connection at pin 124 into the locus of travel of striker pin 98, against the bias of spring loaded plunger assembly 136. Conversely, de-energization of the second solenoid 144 permits the plunger assembly 136 to return interceptor link 112 as well as pull-down bar 150 to their respective retracted positions against the inward face of focus wheel 78 (as shown in FIG. 7).

To permit the control circuit of the exposure control system to de-energize the second solenoid 144 as early as possible in a photographic cycle, a forward tip of the follow-focus striker pin 98 extending from walking beam 96 is formed to define a peripheral flange 158. Accordingly, following the establishment of an appropriate aperture for proper exposure of the photographic subject image at the image plane of the camera as determined by the abutment of striker pin 98 against the leg portion 114 of link 112, solenoid 144 may be de-energized and the peripheral flange 158 and leg portion 114 will remain mechanically captured. This captured status is retained until such time as the first solenoid is energized to terminate an exposure interval. Upon such termination of energization, the walking beam 96 is rotated to release the mechanical capture between the peripheral flange 158 and leg portion 114 and permit plunger assembly 136 to return the interceptor link 112 to its retracted position.

The focus wheel 78 is rotatably mounted about a first axis spaced from and parallel with a second axis of the rotatably mounted lens assembly 94 and coupled to the lens assembly 94 by the coupling apparatus 50 rotatably mounted about a third axis spaced from and parallel with the first and second axes. As previously described, a plurality of gear teeth are disposed around and longitudinally across peripheral edges of the cylindrical bezel 92 of lens assembly 94 and the focus wheel 78 for meshing with the teeth included upon idler gear 72 thereby for positive drive contact with the coupling apparatus 50 between the focus wheel 78 and the lens assembly 94 when the coupling apparatus is in the first position and in engagement therewith. When the focus wheel 78 is rotated, the lens assembly 94 is rotated by the coupling apparatus 50 whereby the lens assembly 94 is synchronously moved rectilinearly along a locus of travel between distant and near foci to obtain a sharply defined image of a photographic subject at the image plane of the camera. The focus wheel 78 is used in conjunction with a viewer 160 (shown in FIG. 8) into which a user simply sights his subject through a single lens reflex viewfinder arrangement to compose and focus an image of the photographic subject therein by rotating the focus wheel 78 to obtain a sharply defined image in the viewer. It should be obvious to one skilled in the art that the above description of viewing and focusing is not restricted to use with the single lens reflex viewfinder and the present invention may be incorporated into substantially any camera having a viewer and an adjustable lens assembly.

The coupling apparatus 50 is illustrated in FIG. 6 in the first position wherein the apparatus 50 is in engagement with the focus wheel 78 and the lens assembly 94. The compression spring 64 urges the collar 66 against leading edges 70 and retains the idler gear 72 in the first position. A predetermined location of the leading edges 70 of the first cylindrical portion 54 restricts the travel of the collar 66 along the flat areas 56 of shaft 52 thereby limiting the length of the spring 64 in an extended position with sufficient force against the collar 66 and idler gear 72 to retain the idler gear 72 in the first position in engagement with the focus wheel 78 and the lens assembly 94. Expandable ring 76, fixedly positioned within groove 74, prevents the idler gear 72 from escaping the first cylindrical portion 54 of shaft 52 under the effect of the force of the spring 64 in the extended position.

The locus of travel of the lens assembly 90 is defined by helical screw threads 162 whereby the lens assembly is axially displaced through the helical screw threads 162 rectilinearly to focus the sharply defined image of the photographic subject at the image plane of the camera when the focus wheel 78 is rotated to compose andd focus the image in the viewing screen.

Figure 8:
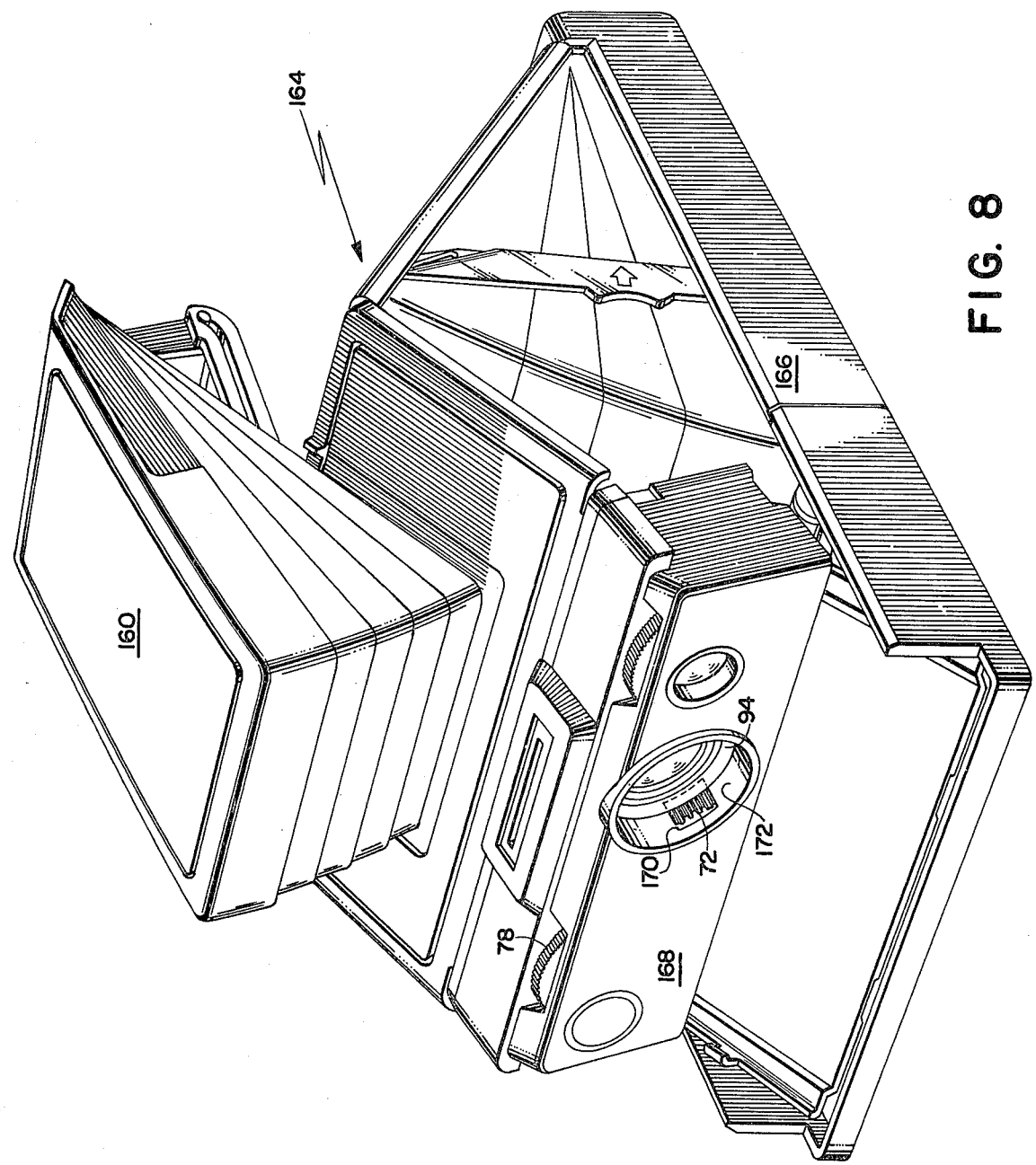
FIG. 8 is a front perspective view of an exposure control system enclosed within the exposure mechanism housing attached to an essentially completed photographic camera.

As previously stated, it is preferable to combine various essential systems such as the viewing system, focusing control system, lens assembly and shutter-aperture control systems, couple them to the camera body and to each other to provide a unitary system which presents the sharply defined image and proper exposure at the image plane of the camera for a variety of camera-to-subject distances. It is also preferable to fine tune or calibrate the various systems as an aggregate, i.e., as an essentially completed camera 164 as shown in FIG. 8 at the image plane thereof whereat a photosensitive surface of a film used therewith will lie.

Figure 5:
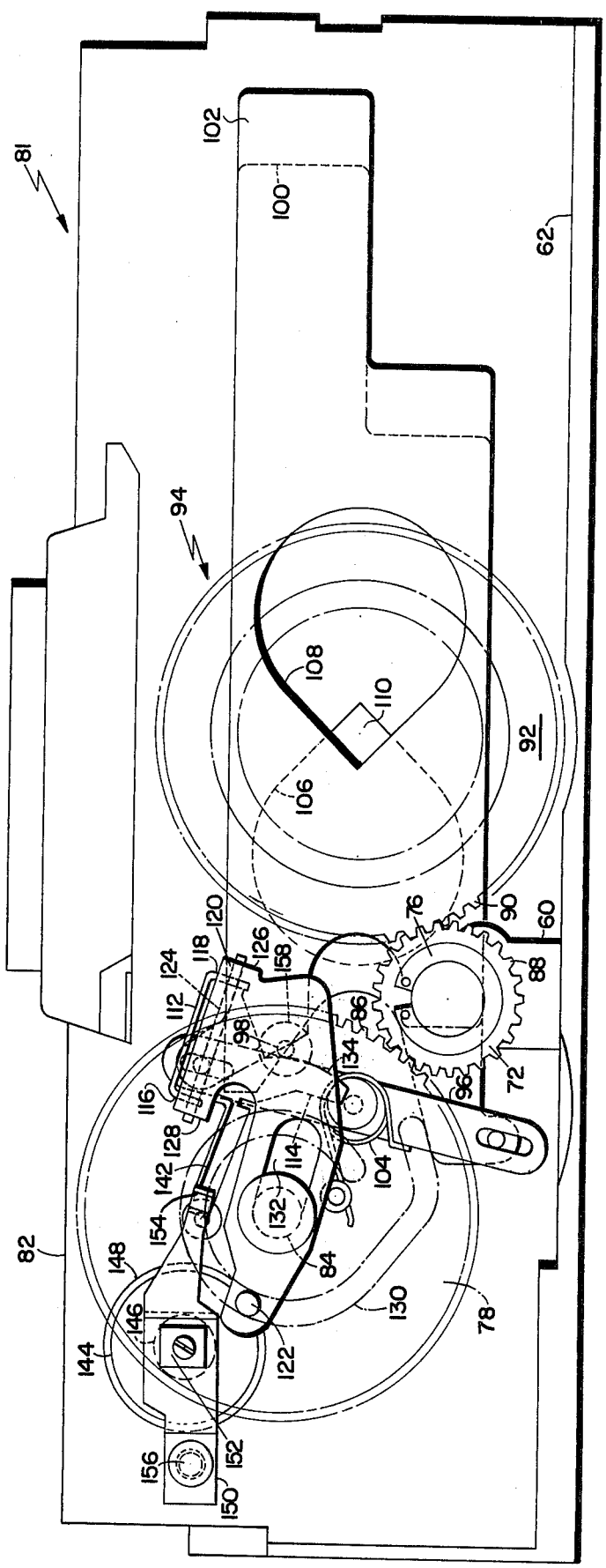
FIG. 5 is a front view of the exposure control mechanism operating to define an exposure aperture during a follow-focus exposure interval.

For a specific, predetermined camera-to-subject distance, the sharply defined image projected upon the viewer screen must be substantially coincident with the sharply defined image at the image plane. Also, for a specific camera-to-subject distance a specific exposure value as determined by an amount of light energy received at the image plane must be obtained. To determine the exposure value in a camera having a follow-focus system, the exposure value is obtained by measuring a fixed light energy source positioned a predetermined distance from the essentially completed camera 164 and comparing therewith the amount of light energy received at the image plane as determined by the arrested position of shutter blades 100 and 102 defining the size of the exposure aperture 110. The arrested position of blades 100 and 102 is determined in response to movement by the focus wheel 78 whereby the leg portion 114 of the interceptor arresting link 112 is moved into the locus of travel of the walking beam 96 to engage striker pin 98, as shown in FIGS. 5 and 6.

The coupling apparatus 50 is illustrated in FIG. 7 in a second position wherein the idler gear 72 is manually moved out of engagement with the gear teeth 86 on focus wheel 78 while simultaneously maintaining engagement with the gear teeth 90 on the cylindrical bezel 92 of the lens assembly 94. The coupling apparatus 50 is depressibly disengaged longitudinally along the first cylindrical portion 54 of the shaft 52 by applying pressure against the idler gear 72 whereby the idler gear 72 is moved into the second position by forcing the collar 66 against the spring 64 which in turn compresses against a face of the mount 60. When the coupling apparatus 50 is forced into the second position the focus wheel 78 and the lens assembly 94 can be calibrated independently relative to each other whereby calibration of the focus of the lens assembly 94 with the focus wheel and adjustment of the exposure aperture 110, as defined by the relative positions of openings 106 and 108 of blades 100 and 102 respectively, can be adjusted to provide the sharply defined image and proper exposure thereof at the image plane.

Once the essentially completed camera 164 has been calibrated to provide a sharply defined image at the image plane and in the viewer 160, and a proper exposure is obtained at the image plane for the selected distance, the coupling apparatus 50 is permitted to return to the first position by releasing the pressure applied to the idler gear 72. The energy stored within the spring 64 during compression is released and moves the collar 66 along the flat areas 56 of the shaft 52 until contacted by leading edges 70 of the first cylindrical portion 54. The idler gear 72 is moved by the action of the collar 66 and prevented from escaping the shaft 52 by the expandable ring 76 positioned within the groove 74. Therefore, the idler gear 72 is substantially assured to be returned to the first position properly located upon the first cylindrical portion 54 between and under the control of the collar 66 and the expandable ring 76 which provide positive stop barriers with the assistance of the leading edges 70 and groove 74.

One skilled in the art will appreciate that the coupling apparatus 50 may be adapted to be disengaged in a similar manner from the lens assembly while remaining in engagement with the focus wheel 100 when the coupling apparatus 50 is depressibly moved out of the first position into the second position for calibration by providing the focus wheel 78 with gear teeth having a greater width than those on the lens assembly 94.

The essentially completed camera 164 shown in an operating position in FIG. 8 is presented at a stage of assembly wherein the assembler or repair person would normally begin the calibration thereof. All of the various systems have been coupled to each other and to the body 166 of the camera 164 including an exposure control housing cover 168 which has been attached to the exposure control housing 81. An access opening 170 for the coupling apparatus 50 is provided within a protective shroud 172 which encompasses the lens assembly 94. A portion of the idler gear 72 shown in FIG. 8 in the first position is available within the access opening 170 for depressible disengagement of the coupling apparatus 50 from the focus wheel 78 for movement thereof longitudinally along the shaft 52 into the second position.

The assembler aims the camera 164 at a predetermined distant target and then rotates the focus wheel 78 to a position representative of the predetermined distance whereby the lens assembly 94 coupled thereto is synchronously positioned to focus an image of the photographic target along the optical path to the image plane of the camera 164 and to the viewer 160. The focus wheel 78 and the lens assembly 94 are independently calibrated so as to bring the rotational position of the focus wheel into correspondence with the linear position of the lens 94, i.e., when the lens properly focuses on a subject located at a predetermined distance then the rotational position of the focus wheel should also be set to represent said predetermined distance, thereby locating the leg position 114 of the interceptor link 112 in position to arrest movement of the shutter blades to properly define the exposure aperture size to provide the proper exposure at the image plane for said predetermined distance. Upon completion of the calibration, the coupling apparatus 50 is released and thereby returns to the first position wherein the coupling apparatus is in driving engagement with the focus wheel 78 and the lens assembly.

The invention may be practiced or embodied in still other ways without departing from the spirit and essential character thereof. The specific and preferred embodiments described herein are therefore to be considered illustrative and not restrictive, the scope of the invention being indicated by the appended claims and all variations which come within the meaning of the claims are intended to be embraced therein.

What is claimed is:

1. An apparatus for calibrating a focusing control system of a photographic camera, comprising:

lens means adjustable to focus an image of a photographic subject positioned a selected distance therefrom at an image plane of the camera;

focusing means mounted for movement to a position corresponding to said selected distance;

means for coupling said focusing means and said lens means whereby said lens means in response to movement of said focusing means is synchronously moved rectilinearly along a locus to travel between distant and nearmost foci to obtain a sharply defined image of the photographic subject at the image plane of the camera; and means for mounting said coupling means for movement between a first position wherein said coupling means is in engagement with said lens means and said focusing means and a second position wherein said coupling means is out of engagement with one of said lens means and said focusing means and in engagement with the other of said lens means and said focusing means whereby said lens means and said focusing means are independently adjustable relative to each other so as to calibrate the focus of said lens means with the position of said focusing means for said selected distance 2. Apparatus as defined in claim 1 wherein said focusing means and said lens means comprise a plurality of rotatably supported members.

3. Apparatus as defined in claim 2 wherein said coupling means comprises an idler gear.

4. Apparatus as defined in claim 3 wherein said lens means and said focusing means include, peripherally disposed upon outer surfaces thereof, means for positive drive contact with said coupling means.

5. Apparatus as defined in claim 4 wherein said mounting means includes resilient biasing means for urging said coupling means out of said second position and into said first position.

6. Apparatus as defined in claim 5 wherein said mounting means further includes a shaft for rotatably supporting said coupling means and a collar slidably mounted upon said shaft and interposed between one end of said biasing means and one side of said coupling means for retaining said biasing means upon said shaft.

7. Apparatus as defined in claim 6 wherein said mounting means further includes latching means fixedly attacched at a free end of said shaft for substantially preventing said coupling means from escaping said free end of said shaft when said coupling means is urged out of said second position into said first position.

8. Apparatus as defined in claim 7 wherein said shaft further includes stop means for contacting and thereby arresting movement of said collar at a predetermined location thereon.

9. An apparatus included within an enclosed exposure control housing of an essentially completed photographic camera for calibrating a focusing control system thereof, comprising:
focusing means rotatably mounted about a first axis for movement to a position corresponding to a selected distance;
lens means rotatably mounted about a second axis spaced from and parallel with said first axis, said lens means being adjustable to focus an image of a photographic subject positioned at said selected distance at an image plane of the camera;
means for coupling said focusing means and said lens means, said coupling means being rotatably mounted about a third axis spaced from and parallel with said first and second axes; and
means for mounting said coupling means for axial movement along said third axis between a first position wherein said coupling means is in engagement with said lens means and said focusing means and a second position wherein said coupling means is out of engagement with one of said lens means and said focusing means and in engagement with the other of said lens means and said focusing means whereby said lens means and said focusing means are independently adjustable relative to teach other so as to calibrate the focus of said lens means with the position of said focusing means for said selected distance.

10. Apparatus as defined in claim 9 wherein said exposure control housing includes means defining an opening therein by which a portion of said coupling means is exposed for manual engagement and movement of said coupling means into said second position.

11. A photographic camera of the type wherein aperture size of a shutter is adjusted as a follow-focus procedure including an apparatus for calibrating a focusing control system, the improvement comprising:
lens means adjustable to focus an image of a photographic subject positioned a selected distance therefrom along an optical path at an image plane of said camera;
a shutter located across said optical path and including at least one element movable along a locus of travel to define a range of apertures across said optical path;
focusing means mounted for movement to a position corresponding to said selected distance;
means for coupling said focusing means and said lens means whereby said lens means in response to movement of said focusing means is synchronously moved rectilinearly along a locus of travel between distant and nearmost foci to obtain a sharply defined image of the photographic subject at said image plane of said camera;
means for limiting the aperture size of said shutter to a value corresponding to said selected distance;
means connecting said limiting means to said focusing means; and
means for mounting said coupling means for movement between a first position wherein said coupling means is in engagement with said lens means and said focusing means and a second position wherein said coupling means is out of engagement with one of said lens means and said focusing means and in engagement with the other of said lens means and said focusing means whereby said lens means and said focusing means are independently adjustable relative to each other so as to calibrate the focus of said lens means with the position of said focusing means and to limit the aperture size of said shutter to a predetermined value for said selected distance.

12. Photographic camera as defined in claim 11 wherein said coupling means comprises a rotatably mounted idler gear.

13. Photographic camera as defined in claim 11 wherein said focusing means includes a focus wheel having peripherally disposed gear teeth for positive drive contact with said coupling means during manual rotation of said focus wheel.

14. Photographic camera as defined in claim 12 wherein said lens means further includes peripherally disposed gear teeth longitudinally arranged across a peripheral surface of said lens means whereby said lens means and said coupling means remain in positive drive contact when said coupling means remain in positive drive contact when said coupling means is moved between said first and second positions.

15. Photographic camera as defined in claim 11 wherein said mounting means includes resilient biasing means for urging said coupling means out of said second position into said first position.

16. Photographic camera as defined in claim 15 wherein said mounting means includes latching means fixedly attached at a free end thereof for substantially preventing said coupling means from escaping said mounting means when said coupling means is urged out of said second position into said first position.

17. A method of matching focusing control means with an adjustable lens assembly coupled thereto in a photographic camera by a coupling device adapted to be depressibly disengaged longitudinally along an axis of rotation of said coupling device from one of said focusing control means and said lens assembly whereby said focusing control means and said lens assembly are independently movable to a position corresponding to a selected camera-to-subject distance, said method comprising:

selecting a distant photographic target;

moving said focusing control means to a position whereat said lens assembly coupled thereto is positioned to focus an image of said photographic target along an optical path at an image plane of said photographic camera;

depressing said coupling device to move it out of engagement with one of said focusing control means and said lens assembly while simultaneously maintaining it in engagement with the other of said focusing control means and said lens lens assembly;

moving said focusing control means to a position corresponding to said selected distance thereby calibrating said lens assembly and said focusing means; and releasing said coupling device for movement into engagement with said focusing control means and said lens assembly.

* * * * *